United States Patent [19]

Economy et al.

[11] 4,258,079

[45] Mar. 24, 1981

[54] PREPARATION OF CONTINUOUS FILMS OF DIACETYLENIC POLYMERS

[75] Inventors: James Economy; Mary Ann Flandera; Cheng-Yih Liu, all of San Jose, Calif.

[73] Assignee: International Business Machines Corporation, Armonk, N.Y.

[21] Appl. No.: 103,245

[22] Filed: Dec. 13, 1979

[51] Int. Cl.$^3$ .......................... B05D 3/02; B05D 3/06; B05D 3/12
[52] U.S. Cl. ..................................... 427/44; 427/240; 427/350; 427/379; 427/385.5; 526/285; 585/19
[58] Field of Search ................... 260/448.2 Q, 590 R, 260/591, 607 B, 607 AR, 609 R; 568/630, 635; 526/135, 147, 285; 585/19, 25, 428, 437, 505; 427/44, 385.5, 388.2, 379, 240, 350; 118/52

[56] References Cited

U.S. PATENT DOCUMENTS

| | | | |
|---|---|---|---|
| 3,300,456 | 1/1967 | Hay | 526/135 |
| 3,494,326 | 2/1970 | Upton | 118/52 X |
| 3,857,821 | 12/1974 | Becker et al. | 526/285 |
| 3,935,167 | 1/1976 | Marvel et al. | 526/285 X |

FOREIGN PATENT DOCUMENTS 1043945 12/1978 Canada ......................................... 285/

*Primary Examiner*—Michael R. Lusignan
*Attorney, Agent, or Firm*—Joseph G. Walsh

[57] ABSTRACT

Continuous films are formed on a substrate by coating said substrate with a solution of a diacetylenic prepolymer in a liquid phenylacetylene solvent and reacting the solvent with the prepolymer.

7 Claims, No Drawings

PREPARATION OF CONTINUOUS FILMS OF DIACETYLENIC POLYMERS

TECHNICAL FIELD

The present invention is concerned with a process for preparing continuous films, i.e., films which are free of pin holes or other discontinuities. In particular, it is concerned with forming continuous films of diacetylenic polymers by a process which involves applying to a substrate a solution of diacetylenic prepolymer in a reactive solvent system, specifically, a system in which a phenylacetylenic compound is the solvent.

BACKGROUND ART

The starting materials for use in the process of the present invention are diacetylenic prepolymers. Such materials are described in detail in the co-pending application Ser. No. 956,517, filed Oct. 31, 1978, now abandoned, in the U.S. Patent and Trademark Office.

In the prior art, normal processing of a polymer which has, for example, been spin-coated on a substrate, involves removing the solvent by oven baking with or without the use of a vacuum. In the prior art there always remains some residual solvent trapped by the film. When such films are then subjected to higher temperatures the solvent is forced out, thereby producing pin holes or internal microporosity. Since such undesirable results can occur after curing, the result is the production of an extremely poor film. It is an object of the present invention to produce films free from such pin holes and free from internal microporosity.

DISCLOSURE OF THE INVENTION

According to the present invention, a continuous film free from pin holes and microporosity is formed by dissolving a diacetylene prepolymer in a solvent which is a liquid phenylacetylenic compound having the formula

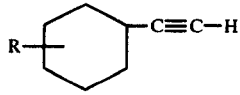

wherein R is H, halogen, lower alkyl or lower alkoxy. A substrate is then coated with said solution to form a film on the substrate. The film is then crosslinked by the application of heat or radiation. Crosslinking brings about the polymerization of the prepolymers, and in this polymerization, the solvent, possessing as it does a reactive acetylene group, is reacted into the polymer structure.

As far as we are aware, the prior art is devoid of any teaching of the use of a reactive acetylenic solvent such as is used in the present invention. By the term "reactive" we mean a solvent capable of reacting at an elevated temperature with polymerizable functional groups in the prepolymer, and thereby becoming incorporated into the polymer network. Such solvent polymerization step will occur during curing of the polymer.

The preferred example of a reactive solvent for use with diacetylenic prepolymer is phenylacetylene. Alternatively, other liquid compounds having, for example, halogen, lower alkyl or lower alkoxy substituents on the phenyl ring may also be used. The solvent dissolves the prepolymer and produces coherent films. The films are then prebaked at 110° C. under vacuum to remove as much solvent as possible. Following this, curing takes place at, for example, 250° C. for three hours, at which temperature the diacetylene bonds crosslink with each other and with free phenylacetylene groups, present either as pendant end groups or in any remaining traces of solvent. By this means, the last traces of solvent are incorporated chemically into the polymer film, and do not cause discontinuities in the film.

The following experiment is described to prove that the phenylacetylene solvent is chemically incorporated into the diacetylenic polymer.

Diphenyl diacetylene and o-methylphenylacetylene were placed in an evacuated vessel, sealed, and heated to 250° C./1 hr. The resultant material was chromatographed on silica gel using hexane as the initial developer to remove unreacted diphenyldiacetylene and o-methylphenylacetylene. The polymer was then eluted with $CHCl_3$. Analysis of the polymer showed the definite appearance of $CH_3$ groups into the polymer. This appearance could occur only by incorporating the free ethynyl group into the polymer network.

Polymer analysis:
IR: Presence of C—H (aliphatic stretches) from $CH_3$'s
  No C≡C—H stretches at 3200 $cm^{-1}$
H—NMR Showed typical 3:2 splitting of a monosubstituted aromatic ring + $CH_3$ protons
$C^{13}$—NMR Definite methyl carbons attached to aromatic ring
TLC No evidence of starting material.

The reactive solvent concept of the present invention is applicable to diacetylene prepolymers as described in patent application Ser. No. 956,517 mentioned above. The most preferred of such materials, however, is poly(triethynyl benzene) prepolymer. Particularly good results have been obtained using this prepolymer with phenylacetylene as the solvent.

The following Example is given solely for the purposes of illustration and is not to be considered a limitation on the invention, many variation of which are possible without departing from the spirit or scope thereof.

PREFERRED EMBODIMENT

Prepolymer of poly(triethynyl benzene) was dissolved in phenylacetylene at a 30%/volume, filtered and spin-coated at 2000 RPM onto a substrate. The film was baked to remove most of the solvent at 115° C. in VAC and then cured at 150° C. and 250° C. in $N_2$. After curing the film was 1 micron thick. The film was then subjected to a 400° C. bake for 30 minutes. The film was examined and found to be free of pinholes and microporosity introduced by residual solvent being expelled at the high temperatures. This was also confirmed by evaporating an aluminum film on top of the cured film and then heating to 400° C. No blistering or opaqueness introduced to the aluminum film.

As a control experiment, in contrast to the process of the present invention as shown in the paragraph above, the following experiment was conducted. Prepolymer of poly(triethynyl benzene) was dissolved in diglyme (bis(2-methoxyethyl)ether) at 40%/volume, filtered and spin-coated at 2000 RPM onto a substrate. The film was baked to remove the solvent, and cured as above. After curing the film was 1 micron thick. After further heating at 400° C., small pinholes were noticed in the surface. Aluminum was evaporated onto the cured film and further baking at 400° C. produced a blistered film.

Various solvent baking schemes were employed varying both temperature and time to remove all the solvent. However, a residual solvent always remains and is trapped by cured material.

We claim:

1. A process for preparing a continuous film of a diacetylene polymer, said process comprising the steps of:

(1) forming a solution of a diacetylenic prepolymer in a solvent which is liquid phenylacetylene compound having the formula:

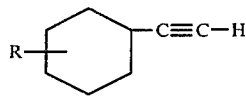

wherein R is H, halogen, lower alkyl or lower alkoxy;

(2) coating a substrate with said solution to form a film thereon; and (3) cross-linking the diacetylene prepolymer and reacting the residual phenylacetylene solvent into the polymer structure.

2. A process as claimed in claim 1 wherein the cross-linking is completed by the application of heat.

3. A process as claimed in claim 1 wherein the cross-linking is completed by the application of radiation.

4. A process a claimed in claim 1 wherein the substrate is coated by spin-coating of the solution.

5. A process as claimed in claim 1 wherein the phenylacetylene compound is phenylacetylene.

6. A process as claimed in claim 1 wherein the diacetylene prepolymer is a poly(triethynylbenzene) prepolymer.

7. A process for preparing a continuous polymeric film, said process comprising the steps of (1) forming a solution of a poly(triethynylbenzene) prepolymer in phenylacetylene;

(2) spin-coating the substrate with said solution to form a film thereon; and (3) curing said film by the application of heat.

* * * * *